(12) United States Patent
Wang et al.

(10) Patent No.: US 8,318,330 B2
(45) Date of Patent: Nov. 27, 2012

(54) MAGNETIC READ/WRITE HEAD SUBSTRATE

(75) Inventors: Yucong Wang, Kagoshima (JP); Shuji Nakazawa, Kagoshima (JP); Yuuya Nakao, Kagoshima (JP); Takuya Gentsu, Shiga (JP); Nobuyuki Horiuchi, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 198 days.

(21) Appl. No.: 12/642,708

(22) Filed: Dec. 18, 2009

(65) Prior Publication Data

US 2010/0091404 A1 Apr. 15, 2010

Related U.S. Application Data

(63) Continuation-in-part of application No. PCT/JP2008/061778, filed on Jun. 27, 2008.

(30) Foreign Application Priority Data

Jun. 27, 2007 (JP) ................. 2007-169694

(51) Int. Cl.
*G11B 5/127* (2006.01)
*C04B 35/117* (2006.01)
(52) U.S. Cl. ....... 428/813; 501/87; 501/127; 360/235.1; 360/235.3
(58) Field of Classification Search ............ 501/87, 501/127; 428/813; 360/235.1, 235.3
See application file for complete search history.

(56) References Cited

U.S. PATENT DOCUMENTS

| 4,902,651 | A | 2/1990 | Wada et al. |
| 5,520,716 | A | 5/1996 | Takagi et al. |
| 7,381,670 | B2 * | 6/2008 | Sugiura et al. ............... 501/87 |
| 7,502,201 | B2 | 3/2009 | Sugiura et al. |
| 2004/0095680 | A1 | 5/2004 | Takahashi |
| 2006/0293166 | A1 * | 12/2006 | Sugiura et al. .............. 501/127 |

FOREIGN PATENT DOCUMENTS

| JP | 63-100054 A | 5/1988 |
| JP | 05-194022 A | 8/1993 |
| JP | 7-242463 A | 9/1995 |
| JP | 2000103667 | * 4/2000 |
| JP | 2004-164771 A | 6/2004 |
| JP | 2005-336034 A | 12/2005 |
| JP | 2006-190398 A | 7/2006 |
| JP | 2007-4934 A | 1/2007 |
| JP | 2007-31191 A | 2/2007 |
| JP | 2007031191 A | 2/2007 |

OTHER PUBLICATIONS

Office Action for Chinese copending Application CN2008800215896 with English translation.
Office Action for copending Japanese Application 2009-520656 dated Sep. 13, 2011.

* cited by examiner

*Primary Examiner* — Karl Group
(74) *Attorney, Agent, or Firm* — Birch, Stewart, Kolasch & Birch, LLP

(57) ABSTRACT

A substrate for a magnetic read/write head is disclosed. The substrate can reduce detachment of crystal grains when the substrate is machined. The substrate may be machined when the substrate is cut into strips or a flow path surface recess is formed to produce the magnetic read/write head. The reduced detachment of crystal grains makes the magnetic read/write head more resilient to chipping, which allows the magnetic read/write head to have a lower and more stable flying height that increases recording density.

20 Claims, 10 Drawing Sheets

MAGNETIC READ/WRITE HEAD SUBSTRATE

CROSS-REFERENCE TO RELATED APPLICATION

The present application is a continuation in part based on PCT application No. JP2008/061778, filed on Jun. 27, 2008, which claims priority to Japanese patent application No. 2007-169694, filed on Jun. 27, 2007 entitled "MAGNETIC HEAD SUBSTRATE, MAGNETIC HEAD AND RECOADING MEDIUM DRIVE DEVICE", the content of which is incorporated by reference herein in their entirety.

FIELD

Embodiments of the present disclosure generally relate to substrates for a magnetic head, and more particularly relate to substrates for a magnetic head used in a recording medium drive device.

BACKGROUND

An example of a magnetic head for recording and reproduction is a magnetic head in which an electromagnetic conversion element is mounted on a slider that flies above and moves relative to a recording medium. Such a magnetic head can be produced by a method as follows. First, an insulating film composed of amorphous alumina is formed on a ceramic substrate composed of an $Al_2O_3$—TiC ceramic, and a plurality of electromagnetic conversion elements are then formed on the insulating film.

Subsequently, the ceramic substrate having the electromagnetic conversion elements thereon is cut into strips, and a cut surface is polished to form a mirror-finished surface. A part of the mirror-finished surface is then removed by an ion-milling method or a reactive ion etching method to form a flow path surface. Subsequently, the strip-shaped ceramic substrate is divided into chips, thus obtaining a magnetic head in which an electromagnetic conversion element is mounted on a slider.

For a recording medium drive device, such as a hard disk drive, in which such a magnetic head is installed, an increase in a storage capacity has been increasingly desired and a higher recording density has been required. To meet these requirements, it is required to markedly reduce a flying height (flying amount) of the magnetic head from a magnetic disk serving as a recording medium to 10 nm or less. In a case of such a small flying height (flying amount), the magnetic head produced as described above may contact the recording medium. Accordingly, it is desired that crystal grains of a composition of a slider constituting the magnetic head be not readily detached by the impact of this contact.

In the $Al_2O_3$—TiC material of the magnetic head slider, it may be difficult to reduce the grain growth of $Al_2O_3$ crystal grains. In such a case, abnormal grain growth of $Al_2O_3$ crystal grains may occur during sintering. As a result, detachment of the $Al_2O_3$ crystal grains may readily occur during a process of cutting a substrate for a magnetic head into strips and forming a flow path surface.

Accordingly, it is desired to reduce detachment of crystal grains during processing (such as cutting, trimming, and etching) of a substrate for a magnetic head and detachment of crystal grains from a slider with a magnetic head made from the substrate.

SUMMARY

A substrate for a magnetic read/write head is disclosed. The substrate can reduce detachment of crystal grains in the substrates when the substrate is machined. The substrate may be machined when the substrate is cut into strips or a flow path surface recess is formed to produce the magnetic read/write head. The reduced detachment of crystal grains makes the magnetic read/write head more resilient to chipping, which allows the magnetic read/write head to have a lower and more stable flying height that increases recording density.

A first embodiment comprises a substrate for a magnetic head. The substrate comprising a sinter comprising at least about 60% by mass and at most about 70% by mass alumina and at least about 30% by mass and at most about 40% by mass titanium carbide. A first value comprises a number of crystal grains of the titanium carbide present on an arbitrary straight line having a length of at least about 10 µm on a cut surface of the sinter. A second value comprises a total of the first value and a number of crystal grains of alumina present on the arbitrary straight line, and a proportion of the first value to the second value is at least about 55% and at most about 75%.

A second embodiment comprises a magnetic head. The magnetic head comprises a slider comprising a sinter. The sinter comprises at least about 60% by mass and at most about 70% by mass alumina and at least about 30% by mass and at most about 40% by mass titanium carbide. A first value comprises a number of crystal grains of the titanium carbide present on an arbitrary straight line having a length of at least about 10 µm on a cut surface of the sinter. A second value comprises a total of the first value and a number of crystal grains of alumina present on the arbitrary straight line. A proportion of the first value to the second value is at least about 55% and at most about 75%. An electromagnetic conversion element is provided on the slider.

A third embodiment comprises a recording medium drive device. The recording medium drive device comprises a magnetic head comprising an electromagnetic conversion element provided on a slider. The magnetic head comprises a sinter comprising at least about 60% by mass and at most about 70% by mass alumina and at least about 30% by mass and at most about 40% by mass titanium carbide. A first value comprises a number of crystal grains of the titanium carbide present on an arbitrary straight line having a length of at least about 10 µm on a cut surface of the sinter. A second value comprises a total of the first value and a number of crystal grains of alumina present on the arbitrary straight line. A proportion of the first value to the second value is at least about 55% and at most about 75%. The recording medium device furthure comprises a recording medium comprising a magnetic recording layer operable to record and reproduce information using the magnetic head, and a motor operable to drive the recording medium.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the disclosure. The figures are provided to facilitate understanding of the disclosure without limiting the breadth, scope, scale, or applicability of the disclosure. The drawings are not necessarily made to scale.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure are described herein in the context of practical non-limiting applications, namely a read/write head for a hard disk drive. Embodiments of the disclosure, however, are not limited to such hard disc drives, and the techniques described herein may also be utilized in other recording medium drive devices. For example, embodiments may be applicable to tape drives.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

The following description is presented to enable a person of ordinary skill in the art to make and use the embodiments of the disclosure. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the embodiments of the present disclosure. Thus, the embodiments of the present disclosure are not intended to be limited to the examples described herein and shown, but are to be accorded the scope consistent with the claims.

Figure 1:
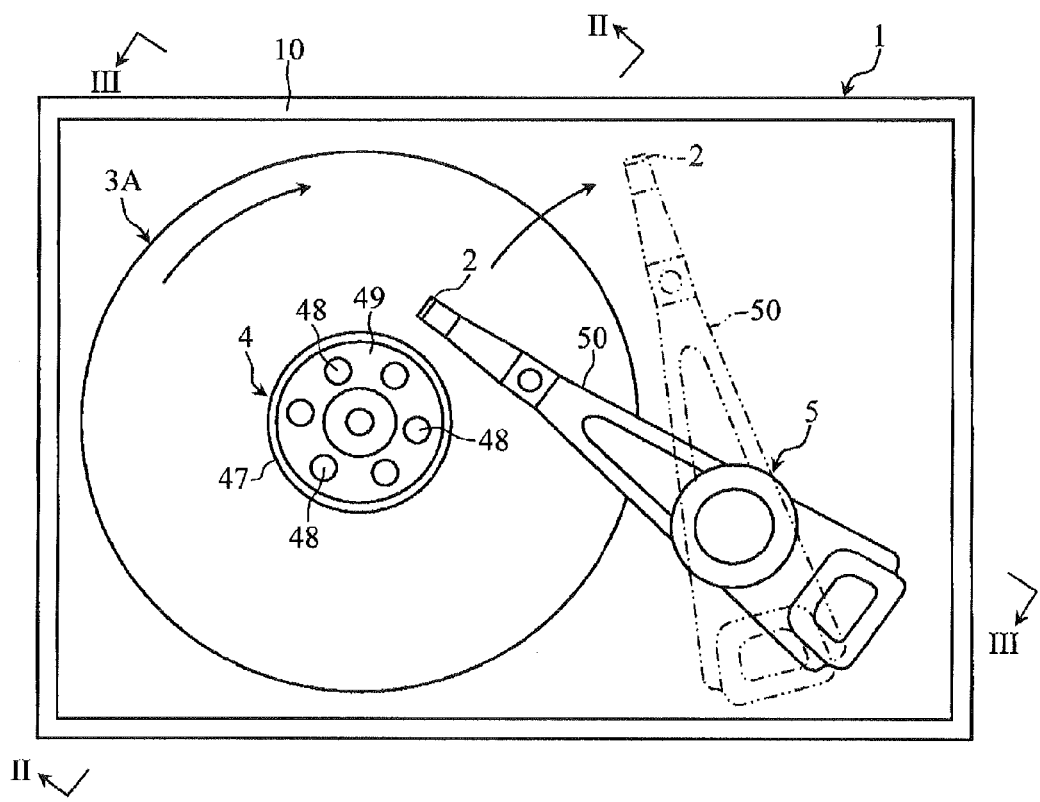
FIG. 1 is an illustration of a plane view of a recording medium drive device according to an embodiment of this disclosure.
Figure 2:
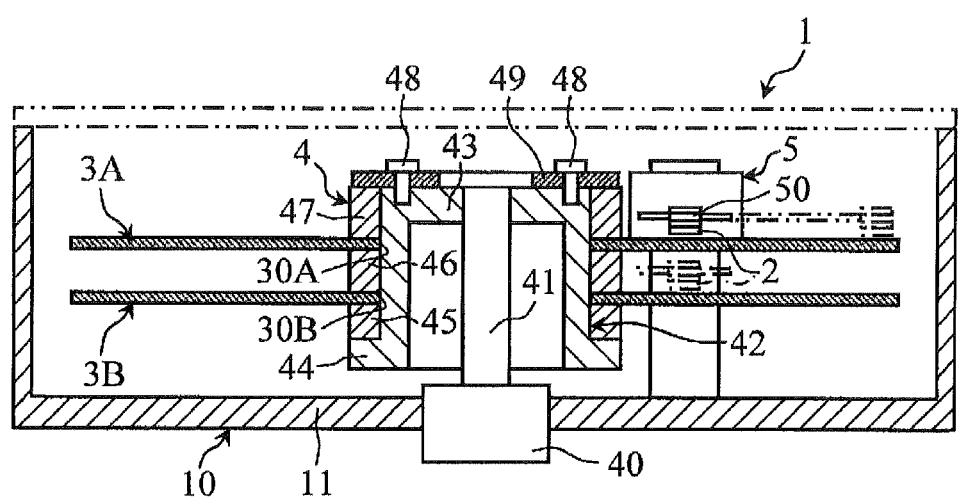
FIG. 2 is an illustration of a sectional view taken along to a line II-II in FIG. 1.
Figure 3:
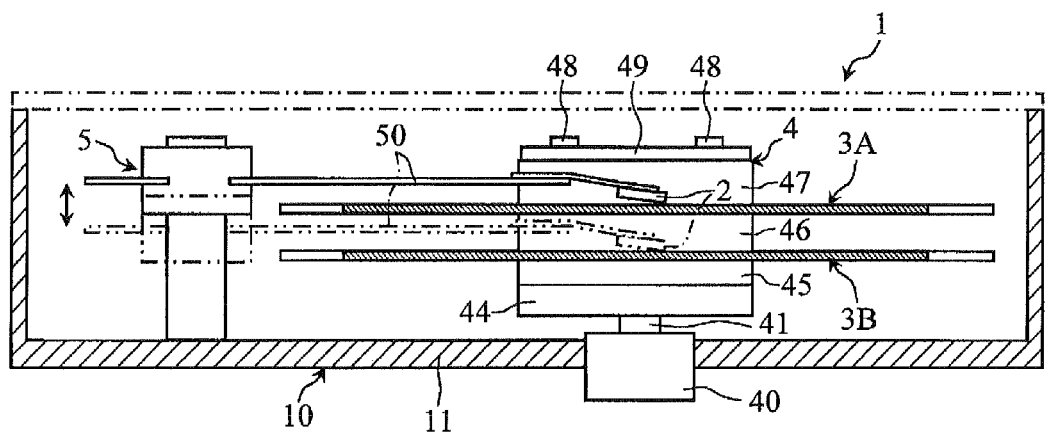
FIG. 3 is an illustration of a sectional view taken along to a line III-III in FIG. 1.

FIG. 1 is an illustration of a plane view of a recording medium drive device 1 (hard disk drive 1) according to an embodiment of this disclosure. FIG. 2 is an illustration of a sectional view taken along a line II-II in FIG. 1. FIG. 3 is an illustration of a sectional view taken along a line III-Ill in FIG. 1.

The hard disk drive 1 comprises a case 10 enclosing a magnetic head 2, magnetic disk 3A and magnetic disk 3B, and a rotation drive mechanism 4. The magnetic head 2 accesses any track to record and reproduce information. The magnetic head 2 is supported by an actuator 5 with a suspension arm 50 therebetween, and is configured to move on the magnetic disks 3A and 3B in a non-contact manner. More specifically, the magnetic head 2 can rotate in a radial direction of the magnetic disks 3A and 3B around the actuator 5 and reciprocally move in the vertical direction. The magnetic head 2 comprises an electromagnetic conversion element 20 and a slider 21.

Figure 4:
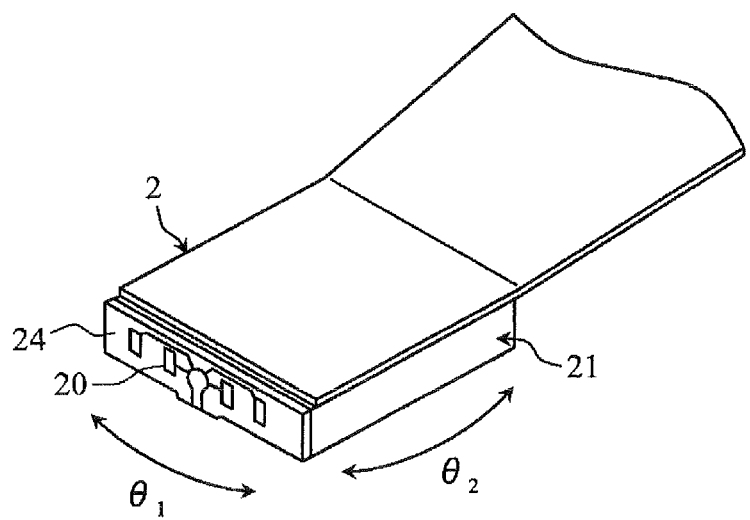
FIG. 4 is an illustration of an expanded perspective view of a magnetic head in a recording medium drive device according to an embodiment of the disclosure.
Figure 5:
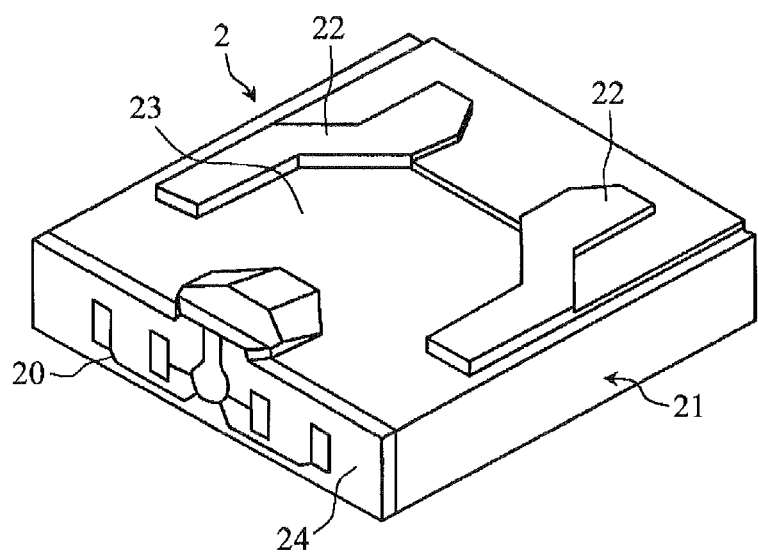
FIG. 5 is an illustration of a perspective bottom view of the magnetic head shown in FIG. 4.

FIG. 4 is an illustration of an expanded perspective view of a magnetic head in a recording medium drive device according to an embodiment of the disclosure. FIG. 5 is an illustration of a perspective bottom view of the magnetic head shown in FIG. 4. As shown in FIG. 4-5, the magnetic head in the recording medium drive device comprises an electromagnetic conversion element 20, a slider 21, a flying surface 22, a flow path surface 23, and an insulating film 24.

The electromagnetic conversion element 20 is operable to exhibit a magnetoresistive effect. The electromagnetic conversion element 20 may be, for example and without limitation, a magnetoresistive (MR) element, a giant magnetoresistive (GMR) element, a tunnel magnetoresistive (TMR) element, and the like. The electromagnetic conversion element 20 may be arranged on a surface of the insulating film 24 provided on an end face of the slider 21.

The slider 21 is a base of the magnetic head 2 and comprises a flying surface 22 and a flow path surface 23. The flying surface 22 is a surface facing the magnetic disks 3A and 3B, and formed as a mirror-finished surface. When the magnetic head 2 is driven, a flying height of the flying surface 22 relative to the magnetic disk 3A is, for example but without limitation, 10 nm or less. The flow path surface 23 functions as a flow path for passing through air for making the magnetic head 2 fly. The flow path surface 23 is formed by, for example but without limitation, an ion-milling method, a reactive ion etching method or the like. A depth of the flow path surface 23 from the flying surface 22 is, for example but without limitation, in a range of about 1.5 to about 2.5 μm. An arithmetic mean roughness (Ra) of the flow path surface 23 is, for example but without limitation, greater than zero nm but at most about 15 nm.

Flying characteristics of the magnetic head 2 are affected by surface properties of the flow path surface 23 provided on the slider 21. The Ra is an indicator of the surface properties. Therefore, by controlling the Ra of the flow path surface 23 to be about 15 nm or less, generation of a turbulent flow on the flow path surface 23 can be reduced. In this manner, the flying characteristics of the magnetic head 2 can be stabilized. Herein, the term "flying characteristics of the magnetic head 2" refers to rolling and pitching of the magnetic head 2. The rolling is a flying characteristic in the direction shown by arrow θ1 in FIG. 4. The pitching is a flying characteristic in the direction shown by arrow θ2 in FIG. 4.

The Ra of the flow path surface 23 can be measured using an atomic force microscope in accordance with, for example but without limitation, the JIS B 0601-2001 measurement standard, and the like. When a size of the slider 21 (flow path surface 23) is small, a measurement length specified in this JIS standard may be set to about 10 μm.

The magnetic disks 3A and 3B (FIG. 2) are each examples of the recording medium and each have a disc shape having through-holes 30A and 30B, respectively. Each of the magnetic disks 3A and 3B comprise a magnetic recording layer (not shown).

As shown in FIG. 2, the rotation drive mechanism 4 can rotate the magnetic disks 3A and 3B and comprises a motor 40 and a rotating shaft 41. The motor 40 provides the rotating shaft 41 with a torque and is coupled to a bottom wall 11 of the case 10. The rotating shaft 41 is operable to rotate by the motor 40 and supports the magnetic disks 3A and 3B. A hub 42 is coupled to the rotating shaft 41. The hub 42 is operable to rotate together with the rotating shaft 41 and comprises an insertion portion 43 and a flange portion 44. The magnetic disks 3A and 3B are stacked on the flange portion 44, with spacers 45, 46, and 47 therebetween, in a state in which the through-holes 30A and 30B are fitted in the insertion portion 43. The magnetic disks 3A and 3B are further coupled to the hub 42 and the rotating shaft 41 by coupling a clamp 49 to the spacer 47 with screws 48. In practice, in the rotation drive mechanism 4, the hub 42 and the magnetic disks 3A and 3B are operable to rotate by rotating the rotating shaft 41 using the motor 40.

A method of producing the magnetic head 2 is described below with reference to FIGS. 6A to 10B.

Figure 6A:
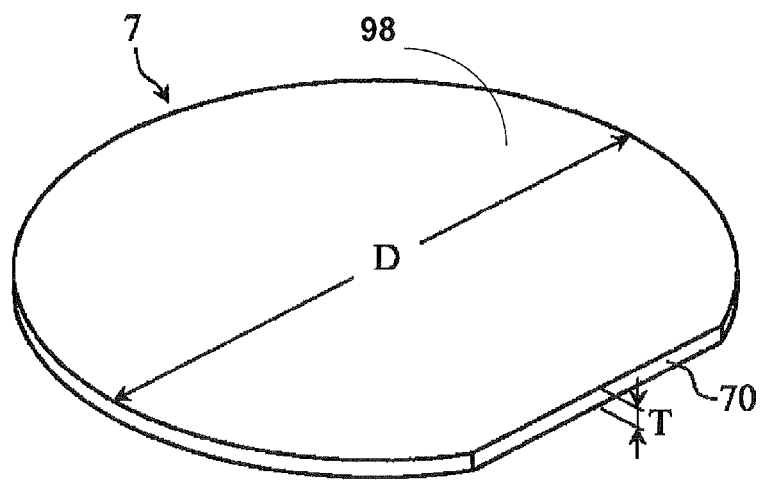
FIG. 6A is an illustration of a perspective view of a substrate for a magnetic head according to an embodiment of the disclosure.
Figure 6B:
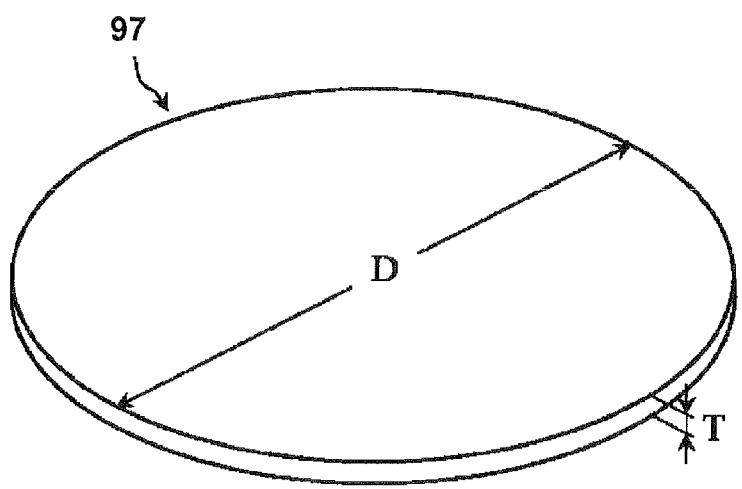
FIG. 6B is an illustration of a perspective view of a substrate for a magnetic head according to an embodiment of the disclosure.

First, a substrate 7 for a magnetic head as shown in FIG. 6A, or a substrate 97 for a magnetic head as shown in FIG. 6B, is prepared. The substrate 7 is prepared by forming an orientation flat 70 in a disc-shaped substrate 97. The orientation flat 70 is used for positioning the substrate 7 when electromagnetic conversion elements 20 are mounted on the sliders 21 or when the substrate 7 is cut into strips. This orientation flat 70 can be formed by cutting a part of the substrate 97 shown in FIG. 6B with a dicing saw.

The substrate 7/97 comprises a sinter having a diameter D in a range of about 102 to about 153 mm and a thickness T in a range of about 1.2 to about 2 mm. The substrate 7/97 comprises a composite sinter comprising alumina ($Al_2O_3$) crystal grains as a main component and titanium carbide (TiC) crystal grains as an accessory component.

The $Al_2O_3$ is a component for ensuring a machinability, abrasion resistance, and heat resistance of the sinter such as the substrate 7/97 for the magnetic head 2. The machinability of the sinter can be evaluated by, for example, measuring an amount of lapping per unit time in a lapping process. The content of the $Al_2O_3$ in the sinter is about 60% by mass or more and about 70% by mass or less. In this range, sufficient machinability can be ensured and chipping during machining can be reduced.

The TiC is a component for adjusting the electrical conductivity and the fracture toughness of the sinter such as the substrate 7/97 for the magnetic head 2. The electrical conductivity of the sinter can be evaluated in terms of, for example, a volume resistivity. The volume resistivity can be measured, for example but without limitation, in accordance with the JIS C 2141-1992. The volume resistivity of the sinter may be about $2 \times 10^{-1}$ Ω·m or less, or about $2 \times 10^{-3}$ Ω·m or less. The content of the TiC in the sinter is about 30% by mass or more and about 40% by mass or less. When the content of the TiC in the sinter is about 30% by mass or more, the sinter can have a high electrical conductivity. Accordingly, when the electromagnetic conversion element 20 is charged in the magnetic head 2 comprising the substrate 7/97, electric charges can be substantially immediately removed. On the other hand, when the content of the TiC in the sinter is about 40% by mass or less, in a sintering step described below, formation of micropores (pores having a diameter in the range of about 100 to about 500 nm) inside the sinter can be reduced. Accordingly, detachment of crystal grains can be reduced in a process after the sintering step. Examples of the process after the sintering step comprise the cutting of the substrate 7/97 and the formation of the flow path surface 23 by an ion-milling method or a reactive ion etching method.

Contents of the $Al_2O_3$ and the TiC in the sinter can be determined from a proportion of Aluminum (Al) element and Titanium (Ti) element obtained by X-ray fluorescence analysis or inductively coupled plasma (ICP) emission spectroscopy. Content of the $Al_2O_3$ can be determined by converting a proportion of the Al element to an oxide, and the content of the TiC can be determined by converting a proportion of Ti element to a carbide.

An average crystal grain size (DT) of the TiC crystal grains in the sinter such as the substrate 7/97 for the magnetic head 2 may be less than about 0.25 μm. When the average crystal grain size of the TiC crystal grains in the sinter is greater than zero and less than about 0.25 μm, abnormal grain growth of the $Al_2O_3$ crystal grains is reduced and detachment of the crystal grains in the sinter can be reduced. On the other hand, from a standpoint that detachment of the crystal grains in the sinter is reduced, an average crystal grain size (DA) of the $Al_2O_3$ crystal grains in the sinter may be equal to or more than the average crystal grain size (DT) of the TiC crystal grains, and at most two times the average crystal grain size (DT) of the TiC crystal grains.

Furthermore, from a standpoint that detachment of crystal grains in the sinter is reduced, the crystal grains in the sinter may have an average crystal grain size of about 0.25 μm or less and a substantially maximum crystal grain size of about 1 μm or less. Herein, the term "crystal grains in the sinter" used in this document refers to the TiC crystal grains and the $Al_2O_3$ crystal grains.

The average crystal grain sizes of the TiC crystal grains and the $Al_2O_3$ crystal grains in the sinter and a substantially maximum crystal grain size of the crystal grains can be determined by analyzing an image taken with a scanning electron microscope (SEM) using image processing software, for example but without limitation, Image-Pro Plus™, manufactured by Media Cybernetics, Inc., and the like.

A proportion R of a number of TiC crystal grains present on any straight line having a length of about 10 μm or more on a cut surface of the sinter to a total of the number of the TiC crystal grains and the number of $Al_2O_3$ crystal grains present on the straight line is about 55% or more and about 75% or less. When the proportion R is about 55% or more, abnormal grain growth of the $Al_2O_3$ crystal grains can be reduced by incorporating the TiC crystal grains. In addition, the TiC crystal grains having a higher hardness than the $Al_2O_3$ crystal grains are dispersed in the sinter, whereby the TiC crystal grains function as components that provide an anchoring effect to the $Al_2O_3$ crystal grains. Consequently, a bonding strength between the crystal grains is improved in the sinter. As a result, detachment of crystal grains can be reduced in a step of cutting the substrate 7/97 for a magnetic head 2 into strips using a slicing machine or a dicing saw, and a step of forming a flow path surface 75 (23) by an ion-milling method or a reactive ion etching method. Furthermore, when the proportion R is about 55% or more, the sinter can have a high electrical conductivity. Therefore, when the magnetic head 2 is charged, the electric charges can be substantially immediately removed. On the other hand, when the proportion R is about 75% or less, the sinterability of the $Al_2O_3$ is improved in the sintering step, and thus the sinter can be densified.

According to an embodiment, the length of an arbitrary straight line on a cut surface of a sinter for determining the ratio R is about 10 μm or more. The average crystal grain size of crystal grains in the sinter is, for example but without limitation, about 0.25 μm or less. Therefore, in the average crystal grain size in this range, with the length of the straight line to be 10 μm or more, the number of TiC crystal grains and the number of $Al_2O_3$ crystal grains can be determined with a high accuracy. An upper limit of a length of the arbitrary straight line may be about 100 μm or less to simplify measurement while sufficiently ensuring the accuracy of the measurement.

The proportion R can be determined by a procedure described below.

First, a surface 98 of the substrate 7/97 for a magnetic head 2 is polished using diamond abrasive grains to form a mirror-finished surface, and the surface 98 is then etched with phosphoric acid for about several tens of seconds. Next, an arbitrary position is selected on the etched surface using a scanning electron microscope (SEM), and an image (SEM image) is taken at a magnification in the range of about 10,000 to about 13,000. The obtained SEM image is processed using, an image processing software, for example but without limitation, JTrim, and the like. Specifically, the SEM image is converted to gray scale, and fine noise is removed with a filter, thus obtaining an image, the contrast of which is more emphasized as compared with the SEM image.

Next, a process of emphasizing the brightness (lightness and darkness) is performed on the image, the contrast of which is emphasized, and binarization is performed. In the image obtained by this process, an area occupied by the crystal grains is displayed as number of pixels. The binarization refers to a process that converts the density of an image to two values of white and black. For example, the $Al_2O_3$ crystal grains are processed as black and the TiC crystal grains are processed as white.

Next, the displayed number of pixels are converted to the area occupied by the TiC crystal grains and the area occupied by the $Al_2O_3$ crystal grains using, for example but without limitation, a software such as Gazou Kara Menseki produced by Teppei Akao, and the like. A total area occupied by these crystal grains may be about 100 μm². In this manner, an area of the TiC crystal grains and an area of the $Al_2O_3$ crystal grains in an area of about 100 μm² is calculated respectively. Next, each portion occupied by the calculated area of the TiC crystal grains and the calculated area of the $Al_2O_3$ crystal grains is considered as a square respectively, and a length of one side of the square is determined for the TiC crystal grains and the $Al_2O_3$ crystal grains respectively. By dividing a determined length of the one side by the average crystal grain size, a calculated number of the TiC crystal grains and a calculated number of the $Al_2O_3$ crystal grains can be determined. The calculated numbers of the TiC crystal grains and the calculated number of the $Al_2O_3$ crystal grains are divided by a total number of TiC crystal grains and the number of $Al_2O_3$ crystal grains (total number of grains) respectively. Whereby a proportion of the number of the TiC crystal grains to the total number of grains present on an arbitrary straight line having a length of about 10 μm and a proportion of the number of $Al_2O_3$ crystal grains to the total number of grains present on the arbitrary straight line having a length of about 10 μm can be determined. In this manner, it is possible to calculate the proportion R of the number of TiC crystal grains to the total of the number of TiC crystal grains and the number of $Al_2O_3$ crystal grains present on an arbitrary straight line having a length of about 10 μm or more. In a case where the proportion of the number of TiC crystal grains present on an arbitrary straight line having a length of about 10 μm or more and about 100 μm or less is determined, a total area occupied by the TiC crystal grains and the $Al_2O_3$ crystal grains is set to be in a range of about 100 to about 10,000 μm².

In addition, the sinter may have a flexural strength of about 800 MPa or more and a thermal conductivity of about 19 W/(m·k) or more.

In a case where the sinter has a flexural strength of about 800 MPa or more, even when the substrate 7/97 for a magnetic head 2 is divided into chips, formation of microcracks can be reduced. As a result, detachment of the crystal grains due to the formation of microcracks can be reduced. Accordingly, the magnetic head 2 comprising the substrate 7/97 can have good contact-start-stop (CSS) characteristics. Similarly, the detachment of the crystal grains due to formation of microcracks can also be reduced in a compact slider, such as but without limitation, a femto-slider, an ato-slider, and the like.

In a case where the sinter has a thermal conductivity of about 19 W/(m·k) or more, heat generated from the electromagnetic conversion element 20 can be immediately dissipated to the slider 21. Therefore, in the magnetic head 2 comprising such a substrate 7/97 having good thermal conductivity, thermal destruction of records stored in a recording medium can be reduced.

The flexural strength of the sinter can be evaluated in terms of the three-point bending strength, for example but without limitation, in accordance with the JIS R 1601-1995 testing method. However, in a case where it may not be possible to cut a specimen specified in this JIS standard from the substrate 7/97 for a magnetic head 2, the thickness T of the substrate 7/97 may be used as a thickness of the specimen. A thermal conductivity of the sinter can be measured, for example but without limitation, in accordance with the JIS R 1611-1997 testing method.

An average pore diameter of pores in the sinter may be less than about 200 nm, and an area occupancy ratio of the pores in the sinter may be less than about 0.03%.

When the average pore diameter of the pores in the sinter is less than about 200 nm, cracks do not tend to propagate into grains that are present around the pores and that are weakly bonded to each other in a process of cutting the substrate 7/97 for a magnetic head and a process by an ion-milling method, a reactive ion etching method, or the like. In addition, when the area occupancy ratio of the pores in the sinter is less than about 0.03%, it is possible to reduce the formation of loose cracks, which propagate from the pores during the above-mentioned processing of the substrate 7/97 for a magnetic head. Accordingly, by controlling the average pore diameter of the pores in the sinter to be less than about 200 nm or by controlling the area occupancy ratio of the pores in the sinter to be less than about 0.03%, detachment of crystal grains can be reduced.

The pores may be present inside the crystal grains, but may not be present in a triple point or a grain boundary portion of two surfaces of the $Al_2O_3$ crystal grains or the TiC crystal grains. The pores may not be aggregated in a grain boundary or inside the grains, but may be scattered. When the pores are present inside the crystal grains, detachment of the crystal grains can be further reduced. When the pores are not aggregated but scattered, cracks propagating from the pores can be reduced, and thus detachment of the crystal grains can be further reduced.

Such a substrate 7/97 for a magnetic head 2 is prepared by, for example but without limitation, pressure sintering using granules obtained by mixing, pulverizing, granulating a material powder, and the like.

A mixture containing an $Al_2O_3$ powder in an amount of about 60% by mass or more and about 70% by mass or less, a $TiO_2$ powder functioning as a sintering aid in an amount of about 0.2% by mass or more and about 10% by mass or less, and the balance of TiC powder is used as the material powder. In order to promote sintering to further densify the resulting sinter, at least one of a $Yb_2O_3$ powder, a $Y_2O_3$ powder, and MgO powder may be added to the material powder in an amount of about 0.1% by mass or more and about 0.6% by mass or less. The material powder is mixed with, for example, a ball mill, a vibration mill, a colloid mill, an attritor, or a high-speed mixer. For example, beads for pulverization having a diameter of about 2.8 mm or less are used for pulverizing the material powder. Consequently, the average particle diameter of the material powder can be controlled to be greater than zero and less than about 0.5 µm, and the average crystal grain size of the resulting sinter can be controlled to be less than about 0.25 µm.

The average particle diameter of the material powder after pulverization can be measured by a liquid-phase precipitation method, a centrifugal sedimentation light transmission method, a laser diffraction scattering method, a laser Doppler method, or the like.

Molding aids such as a binder and a dispersant are added to the pulverized material powder, and the resulting mixture is uniformly mixed. Subsequently, granulation can be performed using a known granulator to obtain granules. Examples of the granulator that can be used comprise a tumbling granulator, a spray dryer, and a compression granulator. The granules are formed so as to have an average particle diameter of, for example, about 100 µm or less. By controlling the average particle diameter of the granules to be about 100 µm or less, aggregation of the pulverized raw material and separation of the composition constituting the raw material can be reduced.

Figure 7:
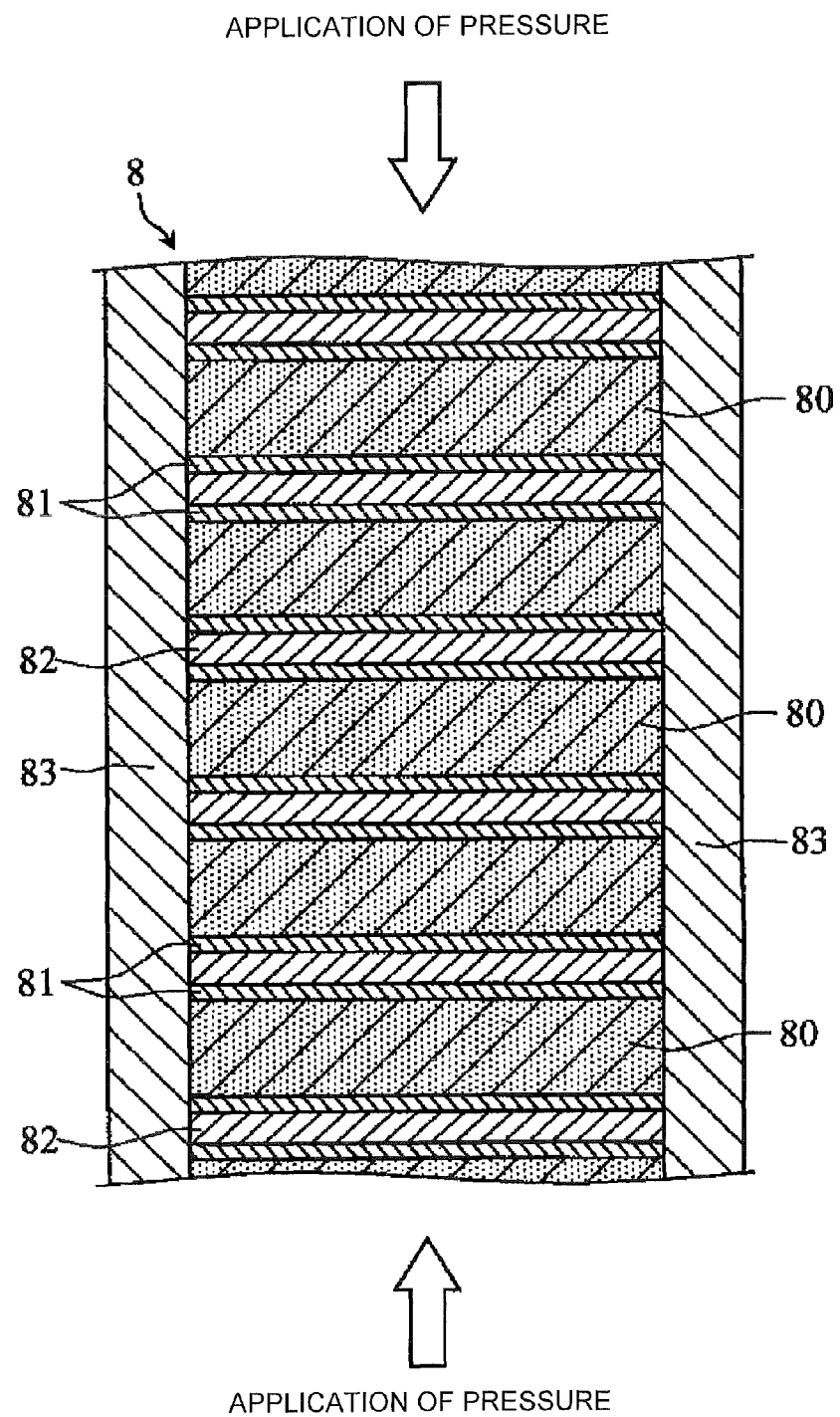
FIG. 7 is an illustration of a sectional view of a substantial part of a pressure-sintering apparatus showing a state in which a compact is located in the pressure sintering-apparatus according to an embodiment of the disclosure.

Pressure sintering is conducted, for example, as follows. Compacts prepared by compacting the granules so as to have a desired shape are placed in a pressure-sintering apparatus. Specifically, as shown in FIG. 7, compacts 80 are arranged, for example, in a pressure-sintering apparatus 8 so as to be stacked with graphite spacers 82 therebetween. Carbonaceous releasing components 81 are disposed between each main surface of the compacts 80 and each spacer 82. In the pressure-sintering apparatus 8, a shield 83 containing a carbonaceous material is disposed around the compacts 80.

By arranging the carbonaceous releasing components 81 in the pressure-sintering apparatus 8, carbon dioxide ($CO_2$) generated when $TiO_2$ is reduced in the sintering step is easily discharged from the sinters. Accordingly, variation in the density of the substrates 7/97 can be decreased.

By arranging the shield 83 containing the carbonaceous material around the compacts 80 in the pressure sintering, an alteration from TiC particles to $TiO_2$ particles can be reduced. Consequently, substrates 7/97 having good machinability can be obtained.

After the compacts 80 are arranged in the pressure-sintering apparatus 8, pressure sintering is conducted in an atmosphere of, for example, argon, helium, neon, nitrogen, or a vacuum at a temperature in the range of about 1,400° C. to about 1,700° C. while a pressure of about 30 MPa or more is applied. Accordingly, the disc-shaped substrate 97 shown in FIG. 6B can be obtained. The substrate 7 shown in FIG. 6A can be formed by cutting a part of the disc-shaped substrate 97 shown in FIG. 6B with a dicing saw.

When the pressure-sintering temperature is controlled to be in the range of about 1,400° C. to about 1,700° C., sufficient sintering can be conducted, and excessive growth of the TiC crystal powder can be reduced while TiC crystal grains are appropriately dispersed. Accordingly, the crystal structure of the resulting sinter gets closer homogeneous, and thus the function of TiC can be sufficiently achieved. In addition, when the pressure applied during the sintering is controlled to be about 30 MPa or more, densification of the sinter is accelerated, and thus a preferable strength of the substrate 7/97 for a magnetic head can be obtained.

The sinter thus obtained is a composite sinter containing $Al_2O_3$ as a main component and TiC as an accessory component. In this composite sinter, the proportion R described above is about 55% or more and about 75% or less.

In this case, when $TiO_2$ is used as a sintering aid, this $TiO_2$ is reduced by a small amount of carbon monoxide (CO) contained in the sintering atmosphere to produce TiO in the sintering step, as shown in reaction formula (1) below. The produced TiO is mixed with TiC to form solid solution, as shown in reaction formula (2) below, to produce $TiC_xO_y$ (x+y<1 and x>>y), where x ranges from about 0.85 to about 0.9 and y ranges from about 0.1 to about 0.15.

$$TiO_2 + CO \rightarrow TiO + CO_2 \qquad (1)$$

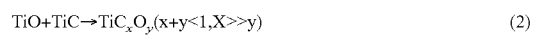

$$TiO + TiC \rightarrow TiC_xO_y (x+y<1, X>>y) \qquad (2)$$

The produced $TiC_xO_y$ has different densities depending on the amount y that represents an amount of TiO forming a solid solution. When the amount y of TiO forming a solid solution is about 0.15, the density of the sinter becomes substantially a maximum.

Most of the $TiO_2$ added as the sintering aid is changed to $TiC_xO_y$. In the ranges of x and y mentioned above, generation of pores having a diameter in the range of about 100 to about 500 nm, which are formed by solid-dissolving TiO in TiC, can be reduced, and aggregation of the pores can also be reduced. As a result, the average diameter of pores in the sinter can be made to be less than about 200 nm, and the area occupancy ratio of pores in the sinter can be made to be less than about 0.03%.

After the pressure sintering, hot isostatic pressing (HIP) sintering may be optionally conducted. By conducting hot isostatic pressing (HIP) sintering, the flexural strength of the sinter can be easily increased to about 800 MPa or more.

Figure 8:
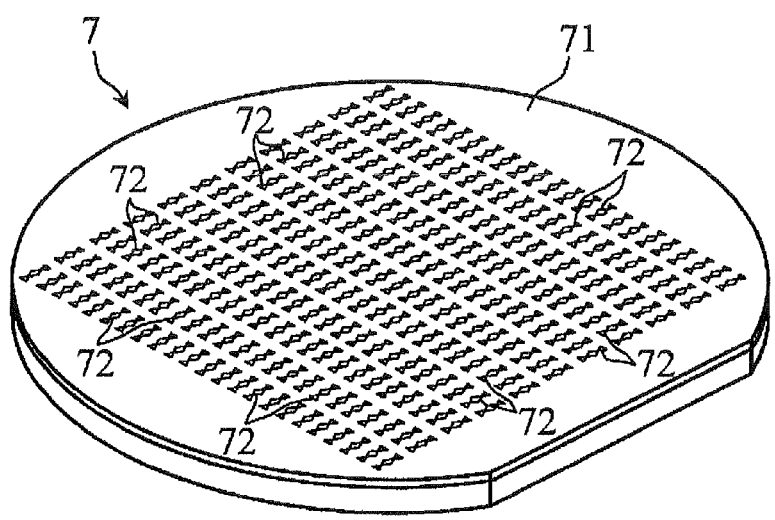
FIG. 8 is an illustration of a perspective view showing a process in which an electromagnetic conversion element is formed on the substrate for a magnetic head according to an embodiment of the disclosure.

As shown in FIG. 8, after a completion of the sintering, electromagnetic conversion elements 72 are formed. Specifically, an insulating film 71 composed of amorphous alumina is deposited on the substrate 7/97 for a magnetic head 2 by a sputtering method, and the electromagnetic conversion elements 72 are then formed on the insulating film 71. The electromagnetic conversion elements 72 may be, for example and without limitation, MR elements, GMR elements, TMR elements, anisotropic magnetoresistive (AMR) elements, and the like.

Figure 9A:
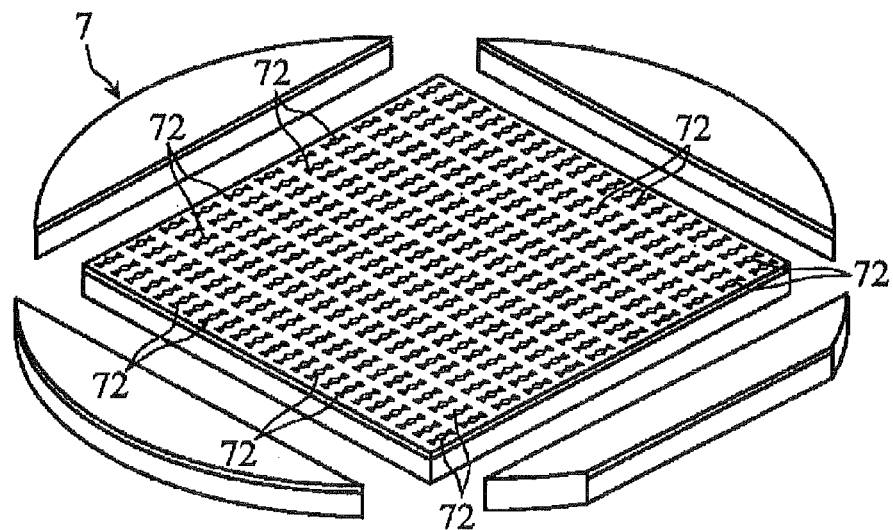
FIG. 9A and FIG. 9B are illustrations of perspective views showing a process in which a substrate for a magnetic head is cut into strips according to an embodiment of the disclosure.

Next, as shown in FIG. 9A, the substrate 7/97 on which the electromagnetic conversion elements 72 are mounted is cut to prepare strips 73. The substrate 7/97 for a magnetic head 2 can be cut, for example but without limitation, with a slicing machine, a dicing saw, or the like.

Figure 9B:
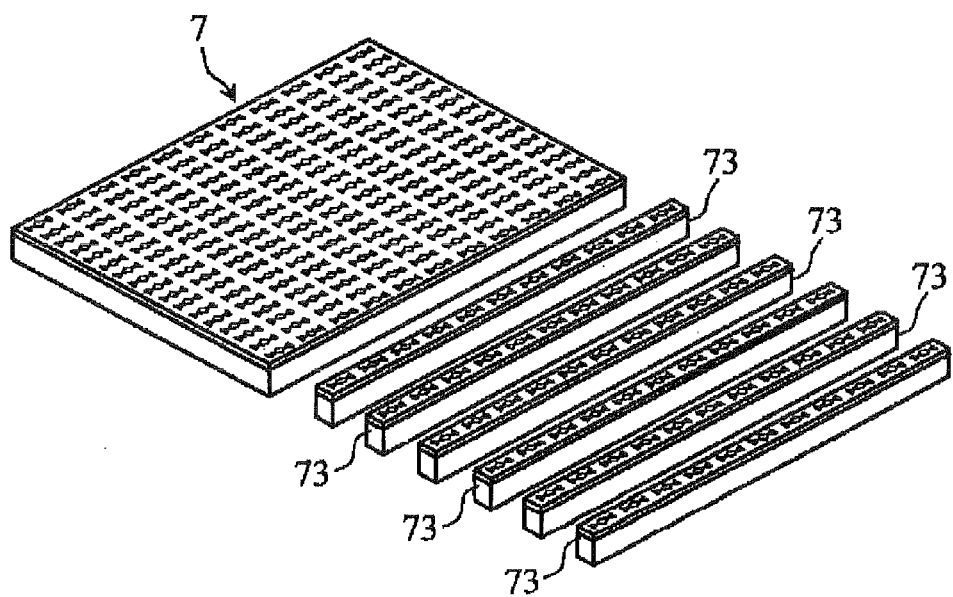

Next, as shown in FIG. 9B, a surface of each of the strips 73 which represents the surface functioning as the flying surface 22 of a slider 21 in FIG. 5, is polished to form a mirror-finished surface. This polishing can be conducted by using, for example but without limitation, a lapping machine, and the like.

Figure 10A:
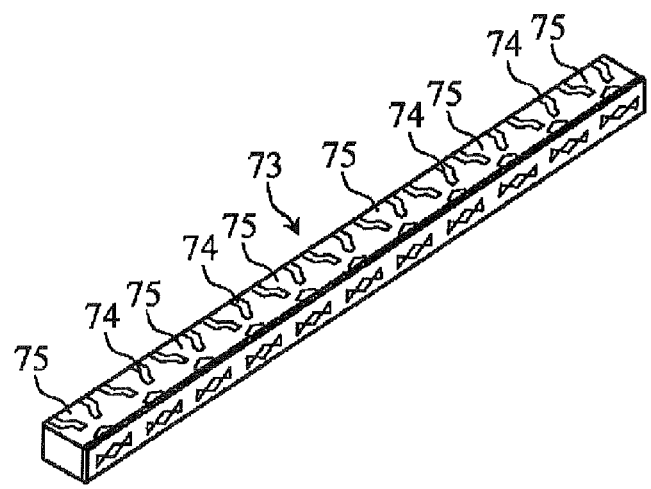
FIGS. 10A and 10B are illustrations of perspective views showing a process in which a magnetic head is formed from strips according to an embodiment of the disclosure.

Next, as shown in FIG. 10A, flow path surfaces 75 (recesses 75) are formed on a polished surface 74 of each strip 73. As mentioned above, each of the recesses 75 functions as the flow path surface 23 configured to pass the air for making the magnetic head 2 fly. Remaining mirror-finished portions of the polished surface 74 (i.e., portions where the recesses 75 are not formed) function as the flying surface 22 (FIG. 5) of the magnetic head 2 facing a magnetic recording medium.

The recesses 75 are formed so as to have a desired shape, depth, and surface roughness by, for example but without limitation, an ion-milling method, a reactive ion etching method, or the like. The depth of each of the recesses 75 is controlled to be, for example, about 1.5 μm or more and about 2.5 μm or less with respect to the polished surface 74 (flying surface 22 in FIG. 5). The arithmetic mean roughness (Ra) on the surface of each of the recesses 75 is controlled to be, for example, greater than zero and less than about 15 nm. When the recess 75 has such a surface roughness, the smoothness of the flow path surface 23 (FIG. 5) of the magnetic head 2 is improved, thereby appropriately controlling the air flow. Consequently, the flying characteristics of the magnetic head 2 can be stabilized.

In order to control the arithmetic mean roughness (Ra) of the recess 75 to be about 15 nm or less, processing conditions are appropriately selected in the ion-milling method or the reactive ion etching method. For example, when the recess 75 is formed by an ion-milling method, the strip 73 may be processed using Ar ions at an accelerating voltage of about 600 V and a milling rate of about 18 nm/min for about 75 to about 125 minutes. On the other hand, when the recess 75 is formed by a reactive ion etching method, the strip 73 may be processed using Ar gas and $CF_4$ gas in a mixed gas atmosphere in which the flow rate of the Ar gas is about $3.4 \times 10^{-2}$ Pa·m³/s and a flow rate of the $CF_4$ gas is about $1.7 \times 10^{-2}$ Pa·m³/s at a pressure of this mixed gas of about 0.4 Pa.

Figure 10B:
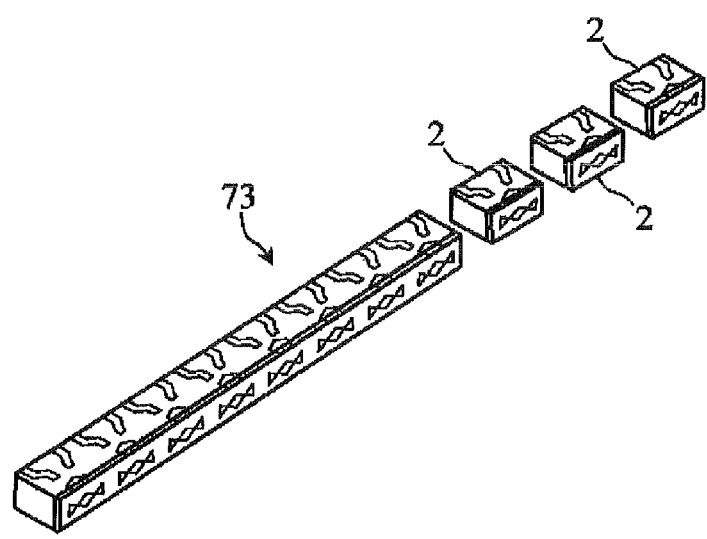

Lastly, as shown in FIG. 10B, the strip 73 comprising the recesses 75 thereon is cut. In this manner, the chip-like magnetic heads 2 shown in FIG. 5 is produced.

The above-mentioned ratio R of the substrate 7/97 for the magnetic head 2 and the slider 21 of the magnetic head 2, which are produced by the method described above, is about 55% or more and about 75% or less. Accordingly, when the substrate 7/97 for a magnetic head is cut into strips with a slicing machine or a dicing saw or when the recesses 75 (flow path surfaces 23) are formed by an ion-milling method or a reactive ion etching method, detachment of the crystal grains can be reduced.

According to the magnetic head 2 obtained from the substrate 7/97 for a magnetic head 2, detachment of the crystal grains from the flow path surface 23 can be reduced while the magnetic head 2 flies above and moves relative to the recording medium. Consequently, possible degradation of the characteristics due to scratches on the recording medium formed by the detached crystal grains can be reduced.

Examples of the present disclosure are described below.

Example 1

In this Example, 14 types of substrates (sample Nos. 1 to 14) for magnetic heads such as the magnetic head 2 were prepared, and proportions of $Al_2O_3$ and TiC in terms of mass, an electrical conductivity, density, the proportion of the number of TiC crystal grains, and machinability of each of the substrates were examined.

Each of the substrates for magnetic heads was produced by preparing a predetermined slurry, forming a compact using the slurry, and then conducting pressure sintering.

The slurry was prepared by charging predetermined amounts of an $Al_2O_3$ powder, a TiC powder, a $TiO_2$ powder, an $Yb_2O_3$ powder, a binder for compaction, and a dispersant in a bead mill. Average particle diameters of beads for pulverization used in this step are shown in Table 1. The particle diameter of the pulverized raw material in the slurry was measured as an average particle diameter using a centrifugal sedimentation light transmission method specified in JIS Z 8823-2: 2004. The measurement results of the particle diameters of the pulverized raw materials are shown in Table 1.

TABLE 1

| Sample No. | Average particle diameter of beads (μm) | Particle diameter of pulverized raw material (μm) | $Al_2O_3$ (mass %) | TiC (mass %) | The number of $Al_2O_3$ crystal grains (A) (on straight line of 10 μm) | The number of TiC crystal grains (B) (on straight line of 10 μm) | Proportion of the number of TiC crystal grains (B/(A + B) × 100) (%) | Volume resistivity (Ω · m) | Density (g/cm³) | Maximum value of chipping (μm) |
|---|---|---|---|---|---|---|---|---|---|---|
| 1 | 0.3 | 0.5 | 55 | 45 | 10 | 9 | 47 | $4 \times 10^2$ | 4.53 | 12 |
| 2 | 0.5 | 0.7 | 60 | 40 | 5 | 5 | 50 | $9 \times 10^2$ | 4.37 | 10 |
| 3 | 0.3 | 0.5 | 60 | 40 | 9 | 8 | 47 | $7 \times 10^2$ | 4.37 | 8 |
| 4 | 0.2 | 0.3 | 60 | 40 | 14 | 17 | 55 | $5 \times 10^2$ | 4.36 | 3 |
| 5 | 0.5 | 0.7 | 64 | 36 | 5 | 4 | 44 | $1 \times 10^1$ | 4.32 | 9 |
| 6 | 0.3 | 0.5 | 64 | 36 | 8 | 10 | 56 | $1 \times 10^1$ | 4.32 | 5 |
| 7 | 0.2 | 0.3 | 64 | 36 | 15 | 20 | 57 | $1 \times 10^1$ | 4.31 | 4 |
| 8 | 0.2 | 0.2 | 64 | 36 | 15 | 31 | 67 | $1 \times 10^1$ | 4.30 | 3 |
| 9 | 0.2 | 0.1 | 64 | 36 | 13 | 38 | 75 | $1 \times 10^1$ | 4.29 | 2 |
| 10 | 0.3 | 0.5 | 70 | 30 | 7 | 9 | 56 | $4 \times 10^1$ | 4.27 | 6 |
| 11 | 0.2 | 0.3 | 70 | 30 | 12 | 16 | 57 | $3 \times 10^1$ | 4.26 | 5 |
| 12 | 0.3 | 0.5 | 75 | 25 | 7 | 6 | 46 | $8 \times 10$ | 4.22 | 9 |
| 13 | 0.3 | 0.3 | 75 | 25 | 11 | 13 | 54 | $6 \times 10$ | 4.21 | 8 |
| 14 | 0.2 | 0.08 | 64 | 36 | 12 | 38 | 76 | $1 \times 10^1$ | 4.23 | 9 |

The slurry was formed into granules by a spray-drying method, and the granules were then compacted by dry pressure compaction to form the compacts.

As shown in FIG. 7, the resulting compacts were arranged on 14 stages for respective samples to be prepared, and pressure sintering was conducted in a vacuum atmosphere at a temperature of 1,600° C., at a pressure of 40 MPa, at a temperature increase rate of 10° C./min, and a hold time of 60 minutes. Subsequently, hot isostatic pressing (HIP) sintering was conducted to prepare substrates for magnetic heads of sample Nos. 1 to 14 each having a diameter of 152.4 mm and a thickness of 3 mm.

The mass ratio in each of the substrates for magnetic heads was measured with an X-ray fluorescence analyzer (e.g., Rigaku ZSX100e, manufactured by Rigaku Corporation). More specifically, first, each of the proportions of Al and Ti relative to 100% by mass of elements (other than carbon (C) and oxygen (O)) constituting the substrate for a magnetic head was measured with the X-ray fluorescence analyzer. Next, the proportion of Al was converted to an oxide thereof and the proportion of Ti was converted to a carbide thereof to calculate the mass ratio of $Al_2O_3$ and TiC in each sample. The measurement results of the mass ratio (mass %) are shown in Table 1.

Notably, the mass ratio of $Yb_2O_3$ was very low, namely, less than 1% by mass in the samples, therefore the mass ratio of $Yb_2O_3$ is not shown in Table 1.

The electrical conductivity of each substrate for a magnetic head was evaluated in terms of the volume resistivity in accordance with the JIS C 2141-1992 testing standard. The measurement results of the volume resistivity are shown in Table 1. When the volume resistivity of a substrate for a magnetic head is $4\times10^{-1}$ $\Omega\cdot m$ or less, electric charges generated on an electromagnetic conversion element can be immediately removed in a magnetic head prepared from such a substrate. Accordingly, when the volume resistivity of a substrate for a magnetic head was $4\times10^{-1}$ $\Omega\cdot m$ or less, the substrate was evaluated as acceptable. When the volume resistivity of a substrate for a magnetic head exceeded $4\times10^{-1}$ $\Omega\cdot m$, the substrate was evaluated as unacceptable.

The density of each substrate for a magnetic head was measured in accordance with the JIS R 1634-1996 testing standard. The measurement results of the density are shown in Table 1. When the density of a substrate for a magnetic head is 4.26 g/cm³ or more, in a magnetic head prepared from such a substrate, pores generated in a recess (flow path surface) can be reduced, and detachment of $Al_2O_3$ crystal grains from the periphery of the pores can be reduced when the magnetic head flies above and moves relative to a recording medium. Accordingly, when the density of a substrate for a magnetic head was 4.26 g/cm³ or more, the substrate was evaluated as acceptable. When the density of a substrate for a magnetic head was less than 4.26 g/cm³, the substrate was evaluated as unacceptable.

The proportion of the number of TiC crystal grains was evaluated by the following procedure as a proportion R of the number of TiC crystal grains (first value) to the total of the number of TiC crystal grains and the number of $Al_2O_3$ crystal grains (second value) present on an arbitrary straight line having a length of 10 μm or more on a cut surface of each substrate for a magnetic head.

First, a surface of a substrate for a magnetic head was polished with diamond abrasive grains to form a mirror-finished surface, and the surface was then etched with phosphoric acid for about several tens of seconds. Next, an arbitrary position on the etched surface was selected using a scanning electron microscope (SEM), and an SEM image was taken at a magnification of 13,000. The area of crystal grains of the TiC and the area of the crystal grains of $Al_2O_3$ were determined from the obtained SEM image using software such as the JTrim and the Gazou Kara Menseki as mentioned above. Each of the areas of the crystal grains was considered as a square. By dividing a side of the square by the average crystal grain size, the number of the TiC crystal grains and the number of the $Al_2O_3$ crystal grains present on the arbitrary straight line having a length of 10 μm were determined. On the basis of the measurement results of the numbers of crystal grains, the proportion R of the number of the TiC crystal grains (first value) to the total of the number of TiC crystal grains and the number of $Al_2O_3$ crystal grains (second value) present on the arbitrary straight line having a length of 10 μm was determined. The measurement results of the number of the TiC crystal grains, the number of $Al_2O_3$ crystal grains, and the proportion R of the number of TiC crystal grains are shown in Table 1.

Machinability of each substrate for a magnetic head was evaluated in terms of a substantially maximum value of chipping in the strips. The substantially maximum value of the chipping was measured as follows. Ten strips were cut out from a single substrate for a magnetic head, and a cut surface of each of the strips was then observed with a metallurgical microscope at a magnification of 400. The strips were cut out using a slicing machine provided with a diamond blade so as to have a length of 70 mm, a width of 3 mm, and a thickness of 2 mm.

A diamond blade SD1200 was used. During the cutting of the substrate for a magnetic head, the number of revolutions of the diamond blade was 10,000 rpm, the feed speed was 100 mm/min, and the amount of cutting per operation was 2 mm.

Measurement results of the substantially maximum value of chipping are shown in Table 1. When the substantially maximum value of chipping in the strips is less than 8 μm, variation in the flying height of a magnetic head can be decreased. Accordingly, when the substantially maximum value of chipping in the strips was 8 μm or more, the strips were evaluated as unacceptable. When the substantially maximum value of chipping was less than 8 μm, the strips were evaluated as acceptable.

As shown in Table 1, sample Nos. 1 to 11 had a volume resistivity of $4\times10^{-1}$ $\Omega\cdot m$ or less and a density of 4.26 g/cm³ or more. Therefore, sample Nos. 1 to 11 reached the acceptable standards in terms of volume resistivity (electrical conductivity) and density. However, in sample Nos. 1 to 3 and sample No. 5, the substantially maximum value of chipping was 8 μm or more, and thus these samples did not reach the acceptable standard and were unacceptable in terms of machinability. The proportion of the number of TiC crystal grains of these samples was low. Accordingly, abnormally grown $Al_2O_3$ crystal grains were generated during firing, and these $Al_2O_3$ crystal grains were detached during the process of cutting the substrates for magnetic heads.

In contrast, in sample No. 4 and sample Nos. 6 to 11, the substantially maximum value of chipping was less than 8 μm, and thus these samples reached the acceptable standard also in terms of machinability. These samples contained the TiC in an amount of 30% by mass or more and 40% by mass or less. Accordingly, both the electrical conductivity (volume resistivity) and machinability (the substantially maximum value of chipping) were improved. Furthermore, in sample No. 4 and sample Nos. 6 to 11, the proportion of the number of the TiC crystal grains present on the arbitrary straight line having the length of 10 μm or more on a cut surface was 55% or more and 75% or less. Accordingly, these samples had high densities and thus were densified. As a result, chipping generated by cutting with a slicing machine was reduced.

As for sample Nos. 12 to 14, the maximum value of chipping was 8 μm or more, which did not satisfy the acceptable standard. Thus, sample Nos. 12 to 14 were not optimal in terms of machinability.

As for sample Nos. 12 and 13, which were not optimal in terms of machinability, the content of the TiC was 25% by mass, and the number of the TiC crystal grains to the total of the number of TiC crystal grains and the number of $Al_2O_3$ crystal grains was small. Accordingly, the proportion of the number of the TiC crystal grains was low, and abnormally grown $Al_2O_3$ crystal grains were generated during firing, and thus these $Al_2O_3$ crystal grains were detached during the cutting process.

As for sample No. 14, which was not optimized in terms of machinability, the proportion of the number of the TiC crystal grains was high. Accordingly, sintering of the $Al_2O_3$ was inhibited in the sintering process and the substrate was not densified, and as a result, $Al_2O_3$ crystal grains were detached from the periphery of pores present in the sample by being cut with the slicing machine.

Example 2

In this Example, the relationship between the average crystal grain size of the TiC crystal grains and machinability was examined with respect to substrates for magnetic heads.

The substrates for magnetic heads were prepared under conditions substantially the same as those used in Example 1. However, in this Example, five types of slurry were prepared using a raw material of sample No. 8 (Table 1) used in Example 1 by varying the pulverization time as shown in Table 2 below, and substrates (sample Nos. 15 to 19) for magnetic heads were prepared from these slurries.

The average crystal grain size of the TiC crystal grains of each substrate for a magnetic head was determined by analyzing an image of a range of 5 μm×8 μm taken with a scanning electron microscope (SEM) at a magnification of 13,000 using image processing software (e.g., Image-Pro Plus™ manufactured by Media Cybernetics, Inc.). The measurement results of the average crystal grain size are shown in Table 2 below.

Machinability of each substrate for the magnetic head was evaluated in terms of the substantially maximum value of chipping in strips by a method substantially the same as the method used in Example 1. A diamond blade having the same specification as that in Example 1 was used, but the feed speed of the diamond blade was set to 140 mm/min so that the machining condition was severer than that in Example 1. As for the substantially maximum value of chipping, a chipping having the largest dimension in the longitudinal direction on a cut surface of a strip was selected, and the value of the selected chipping was shown in Table 2.

TABLE 2

| Sample No. | Pulverization time (min) | Average crystal grain size of TiC crystal grains (μm) | Maximum value of chipping generated on cut surface (μm) |
| --- | --- | --- | --- |
| 15 | 30 | 0.40 | 9 |
| 16 | 50 | 0.30 | 7 |
| 17 | 60 | 0.24 | 5 |
| 18 | 70 | 0.20 | 4 |
| 19 | 80 | 0.15 | 3 |

As shown in Table 2, in sample Nos. 17 to 19, even when the samples were machined under the severe condition, i.e., at a feed speed of the diamond blade of 140 mm/min, the substantially maximum value of chipping was small, namely, 5 μm. Thus, sample Nos. 17 to 19 reached the acceptable standard in terms of machinability. The average crystal grain size of the TiC crystal grains of sample Nos. 17 to 19 was less than 0.25 μm. Accordingly, when the average crystal grain size of the TiC crystal grains was less than 0.25 μm, good machinability was realized.

Example 3

In this Example, the relationship between the flexural strength and machinability was examined with respect to substrates for magnetic heads.

The substrates for magnetic heads were prepared under conditions substantially the same as those used in Example 1. However, in this Example, each of the substrates (sample Nos. 20 to 22) for magnetic heads was prepared by pressure-sintering a compact composed of the raw material of sample No. 8 (Table 1) used in Example 1, and then conducting hot isostatic pressing (HIP) sintering at a temperature shown in Table 3 below for one hour.

A flexural strength of each substrate for a magnetic head was measured as a three-point bending strength in accordance with the JIS R 1601-1995 measurement standard. The measurement results of the three-point bending strength are shown in Table 3 below.

Machinability of each substrate for the magnetic head was evaluated in terms of the substantially maximum value of chipping in strips by a method substantially the same as the method used in Example 1. A diamond blade having the same specification as that in Example 1 was used, but the feed speed of the diamond blade was set to 180 mm/min so that the machining condition was severer than the conditions in Examples 1 and 2. As for the maximum value of chipping, a chipping having the largest dimension in the longitudinal direction on a cut surface of a strip was selected, and the value of the selected chipping was shown in Table 3.

TABLE 3

| Sample No. | Hot isostatic pressing sintering temperature (° C.) | Three-point bending strength (MPa) | Maximum value of chipping (μm) |
| --- | --- | --- | --- |
| 20 | 1500 | 710 | 9 |
| 21 | 1550 | 800 | 4 |
| 22 | 1600 | 830 | 2 |

As shown in Table 3, in sample Nos. 21 and 22, even when the machining condition was severe, that is, even when the feed speed of the diamond blade was 180 mm/min, the substantially maximum value of chipping generated was small and detachment of the crystal grains did not tend to occur because the samples had high three-point bending strengths of 800 MPa or more.

Example 4

In this Example, the relationship between the arithmetic mean roughness (Ra) of a recess (flow path surface) and variation in the flying height of a magnetic head was examined with respect to magnetic heads.

Each of the magnetic heads was prepared using a substrate for a magnetic head under the same conditions as those of sample No. 8 used in Example 1. The substrate for a magnetic head was cut into strips, and a cut surface of each of the strips was polished so as to have a mirror-finished surface. The recess (flow path surface) was then formed by removing a part of the mirror-finished surface using an ion-milling apparatus (e.g., Model AP-MIED manufactured by JEOL Ltd.). As for an ion-milling process, Ar ions were used, the accelerating voltage was set to 600 V, and the milling process was conducted at different milling rates shown in Table 4 below until the depth of a recess reached 0.2 μm, whereby recesses having different surface roughnesses were formed. The strips after trimming were cut with a diamond blade to prepare magnetic heads (sample Nos. 23 to 25). A femto-slider having a length of 0.85 mm, a width of 0.7 mm, and a thickness of 0.23 mm was used as a slider provided on each of the magnetic heads.

The arithmetic mean roughness (Ra) of the recess (flow path surface) was measured using an atomic force microscope in accordance with JIS B 0601-2001. However, the measurement length was set to 10 μm.

The flying height (flying amount) of each of the magnetic heads was measured with a flying height tester. In this measurement with the flying height tester, the magnetic head was made to fly above a transparent glass substrate not having a magnetic recording layer thereon while rotating the glass substrate. The flying height of the magnetic head was measured ten times in total, every five seconds, at a peripheral velocity of the glass substrate of 12.44 mm/s. The measurement results of the flying height of the magnetic heads are shown in Table 4 in terms of the average of the ten times measurement and the standard deviation.

TABLE 4

| Sample No. | Milling rate (nm/min) | Arithmetic mean roughness (Ra) of flow path surface (nm) | Flying height Average (nm) | Flying height Standard deviation (nm) |
|---|---|---|---|---|
| 23 | 15 | 9 | 9 | 0.03 |
| 24 | 20 | 15 | 10 | 0.05 |
| 25 | 25 | 18 | 11 | 0.10 |

As shown in Table 4, as for the magnetic heads of sample Nos. 23 and 24 in which the arithmetic mean roughness (Ra) of the recess (flow path surface) was 15 nm or less, the average of the flying height (flying amount) was low, namely, 10 nm or less, and the standard deviation was also small, namely, 0.05 nm or less, indicating that the flying characteristics of these magnetic heads are stable.

Example 5

In this Example, the relationship among the average pore diameter, the area occupancy ratio of pores, and machinability was examined with respect to substrates for magnetic heads.

The substrates for magnetic heads were prepared under conditions substantially the same as those used in Example 1. However, in this Example, seven types of slurry were prepared using the raw material of sample No. 9 (Table 1) used in Example 1 by varying the particle diameter of the pulverized raw material as shown in Table 5 below, and substrates (sample Nos. 26 to 32) for magnetic heads were prepared from these slurries.

The average pore diameter and the area occupancy ratio of pores were measured on the basis of SEM images obtained using a scanning electron microscope after polishing a cross section of a sinter with a Cross Section Polisher (e.g., manufactured by JEOL Ltd.) so as to form a mirror-finished surface. Fifteen fields of view (12.6 μm×8.8 μm) of arbitrary positions on the mirror-finished surface were selected and the SEM images were taken at a magnification of 10,000.

The substantially maximum major axes of the pores in the obtained SEM images were measured, and the average of the substantially maximum major axes was calculated to determine the average pore diameter. The measurement results of the average pore diameter are shown in Table 5 below.

In the measurement of the area occupancy ratio of pores, area of the pores was determined from the SEM images using the software such as the JTrim and the Gazou Kara Menseki as mentioned above to calculate a total area of the pores in 15 fields of view. Furthermore, the proportion of the total area of the pores to a total area (12.6 μm×8.8 μm×15) of the SEM images corresponding to the 15 fields of view was determined to calculate the area occupancy ratio of the pores. The measurement results of the area occupancy ratio of the pores are shown in Table 5 below.

Machinability of each of the substrates for magnetic heads was evaluated in terms of the substantially maximum value of chipping in strips by a method substantially the same as the method used in Example 1. A diamond blade having the same specification as that in Example 1 was used, but the feed speed of the diamond blade was set to 140 mm/min as in Example 2 so that the machining condition was severer than that in Example 1. As for the maximum value of chipping, a chipping having substantially the largest dimension in the longitudinal direction on a cut surface of a strip was selected, and the value of the selected chipping is shown in Table 5.

TABLE 5

| Sample No. | Particle diameter of pulverized raw material (μm) | Average pore diameter (nm) | Area occupancy ratio of pores (%) | Maximum value of chipping (μm) |
|---|---|---|---|---|
| 26 | 0.8 | 450 | 0.042 | 11 |
| 27 | 0.6 | 238 | 0.033 | 9 |
| 28 | 0.5 | 195 | 0.029 | 6 |
| 29 | 0.4 | 173 | 0.026 | 4 |
| 30 | 0.3 | 136 | 0.021 | 4 |
| 31 | 0.2 | 73 | 0.017 | 3 |
| 32 | 0.1 | 32 | 0.0003 | 2 |

As shown in Table 5, in sample Nos. 28 to 32, which had an average pore diameter of less than 200 nm, even when the samples were machined under a severe condition, i.e., at a feed speed of the diamond blade of 140 mm/min, the maximum value of chipping was small, namely, 6 μm or less, and good machinability could be realized. In particular, in sample Nos. 31 and 32, which had the average pore diameter of less than 100 nm, the substantially maximum value of chipping was 3 μm or less, and thus these samples had good machinability.

In sample Nos. 28 to 32, in which the area occupancy ratio of pores was less than 0.03%, the substantially maximum value of chipping was small, namely, 6 μm or less, and thus these samples had good machinability. In particular, in sample Nos. 31 and 32, in which the area occupancy ratio of pores was less than 0.02%, the substantially maximum value of chipping was 3 μm or less, and thus these samples had good machinability.

According to the results of Examples 1 to 5, the use of the substrate for a magnetic head according to any of these Examples can reduce detachment of crystal grains generated when the substrate is cut into strips or when a recess (flow path surface) is formed in producing the magnetic head. Consequently, chipping can be reduced. Accordingly, the smoothness of the recess (flow path surface) was improved, the flying height of the magnetic head was low, and variation in the flying height was reduced.

Accordingly, in a recording medium drive device comprising the above magnetic head, the flying height of the magnetic head can be low and variation in the flying height can be stabilized, and thus the recording density can be increased.

Although exemplary embodiments of the present disclosure have been described above with reference to the accompanying drawings, it is understood that the present disclosure is not limited to the above-described embodiments. Various alterations and modifications to the above embodiments are contemplated to be within the scope of the disclosure. It should be understood that those alterations and modifications are included in the technical scope of the present disclosure as defined by the appended claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "existing," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While at least one exemplary embodiment has been presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying Tables, it is to be noted that changes and modifications may be apparent to those skilled in the art. Such changes and modifications are to be understood as being included within the scope of the present disclosure as defined by the claims.

The invention claimed is:

1. A substrate for a magnetic head, comprising:
a sinter comprising at least about 60% by mass and at most about 70% by mass alumina and at least about 30% by mass and at most about 40% by mass titanium carbide, wherein
a first value comprises the number of crystal grains of the titanium carbide present on an arbitrary straight line having a length of at least about 10 μm on a cut surface of the sinter,
a second value comprises the total of the first value and the number of crystal grains of the alumina present on the arbitrary straight line, and
the proportion of the first value to the second value is at least about 55% and at most about 75%.

2. The substrate according to claim 1, wherein the crystal grains of the titanium carbide in the sinter have an average crystal grain size of greater than zero and less than about 0.25 μm.

3. The substrate according to claim 1, wherein a ratio (DA/DT) of an average crystal grain size (DA) of the crystal grains of the alumina to an average crystal grain size (DT) of the crystal grains of the titanium carbide in the sinter is at least about 1 and at most about 2.

4. The substrate according to claim 1, wherein crystal grains of alumina and of titanium carbide in the sinter have an average crystal grain size of at most 0.25 μm.

5. The substrate according to claim 1, wherein crystal grains of alumina and of titanium carbide in the sinter have a substantially maximum crystal grain size of at most about 1 μm.

6. The substrate according to claim 1, wherein pores in the sinter have an average pore diameter of less than about 200 nm.

7. The substrate according to claim 6, wherein the pores in the sinter have an average pore diameter of less than about 100 nm.

8. The substrate according to claim 1, wherein an area occupancy ratio of pores in the sinter is less than about 0.03%.

9. The substrate according to claim 8, wherein the area occupancy ratio of the pores in the sinter is less than about 0.02%.

10. The substrate according to claim 1, wherein the sinter has a flexural strength of at least about 800 MPa.

11. A magnetic head comprising:
a slider comprising a sinter, the sinter comprising
at least about 60% by mass and at most about 70% by mass alumina, and at least about 30% by mass and at most about 40% by mass titanium carbide, wherein
a first value comprises the number of crystal grains of the titanium carbide present on an arbitrary straight line having a length of at least about 10 μm on a cut surface of the sinter,
a second value comprises the total of the first value and the number of crystal grains of alumina present on the arbitrary straight line, and
the proportion of the first value to the second value is at least about 55% and at most about 75%; and
an electromagnetic conversion element on the slider.

12. The magnetic head according to claim 11,
wherein the slider comprises a flying surface and a flow path surface operable to pass air, and
the flow path surface has an arithmetic mean roughness (Ra) of at most about 15 nm.

13. A recording medium drive device comprising:
a magnetic head comprising a slider and an electromagnetic conversion element on the slider, the magnetic head comprises:
a sinter comprising at least about 60% by mass and at most about 70% by mass alumina and at least about 30% by mass and at most about 40% by mass titanium carbide, wherein
a first value comprises the number of crystal grains of the titanium carbide present on an arbitrary straight line having a length of at least about 10 μm on a cut surface of the sinter, a second value comprises the total of the first value and the number of crystal grains of alumina present on the arbitrary straight line, and the proportion of the first value to the second value is at least about 55% and at most about 75%;

a recording medium comprising a magnetic recording layer operable to record and reproduce information using the magnetic head; and a motor configured to drive the recording medium.

14. The recording medium drive device according to claim 13, wherein the slider comprises a flying surface and a flow path surface operable to pass air, and the flow path surface has an arithmetic mean roughness (Ra) of at most about 15 nm.

15. The recording medium drive device according to claim 13, wherein the crystal grains of the titanium carbide in the sinter have an average crystal grain size of greater than zero and less than about 0.25 μm.

16. The recording medium drive device according to claim 13, wherein a ratio (DA/DT) of an average crystal grain size (DA) of the crystal grains of the alumina to an average crystal grain size (DT) of the crystal grains of the titanium carbide in the sinter is at least about 1 and at most about 2.

17. The recording medium drive device according to claim 13, wherein crystal grains of alumina and of titanium carbide in the sinter have an average crystal grain size of at most 0.25 μm.

18. The recording medium drive device according to claim 13, wherein crystal grains of alumina and of titanium carbide in the sinter have a substantially maximum crystal grain size of at most about 1 μm.

19. The recording medium drive device according to claim 13, wherein pores in the sinter have an average pore diameter of less than about 200 nm, or less than about 100 nm.

20. The recording medium drive device according to claim 13, wherein an area occupancy ratio of pores in the sinter is less than about 0.03%, or less than about 0.02%.

* * * * *